(12) United States Patent
Lark et al.

(10) Patent No.: US 9,142,352 B2
(45) Date of Patent: Sep. 22, 2015

(54) CAPACITOR FOR HIGH G-FORCE APPLICATIONS

(71) Applicants: Patrick William Lark, Pickens, SC (US); William Ray Gilstrap, Liberty, SC (US)

(72) Inventors: Patrick William Lark, Pickens, SC (US); William Ray Gilstrap, Liberty, SC (US)

(73) Assignee: Cornell-Dubilier Marketing, Inc., Liberty, SC (US)

( * ) Notice: Subject to any disclaimer, the term of this patent is extended or adjusted under 35 U.S.C. 154(b) by 184 days.

(21) Appl. No.: 14/014,762

(22) Filed: Aug. 30, 2013

(65) Prior Publication Data

US 2015/0062783 A1    Mar. 5, 2015

(51) Int. Cl.
| | |
|---|---|
| H01G 9/08 | (2006.01) |
| H01G 2/10 | (2006.01) |
| H01G 4/012 | (2006.01) |
| H01G 9/10 | (2006.01) |
| H01G 9/04 | (2006.01) |
| H01G 4/228 | (2006.01) |

(52) U.S. Cl.
CPC .............. *H01G 2/103* (2013.01); *H01G 4/012* (2013.01); *H01G 4/228* (2013.01); *H01G 9/04* (2013.01); *H01G 9/08* (2013.01); *H01G 9/10* (2013.01)

(58) Field of Classification Search
CPC ......... H01G 4/012; H01G 4/228; H01G 9/04; H01G 9/08; H01G 9/10
USPC ................. 361/508, 509, 516–519, 523–525, 361/528–529, 535–537; 607/5, 7, 9
See application file for complete search history.

(56) References Cited

U.S. PATENT DOCUMENTS

| | | |
|---|---|---|
| 3,644,796 A | 2/1972 | Carino |
| 3,852,647 A | 12/1974 | Ishii |
| 4,385,342 A | 5/1983 | Puppolo et al. |
| 4,554,221 A | 11/1985 | Schmid |
| 4,584,630 A | 4/1986 | Rubin |
| 4,659,636 A | 4/1987 | Suzuki et al. |
| 4,987,519 A | 1/1991 | Hutchins et al. |
| 5,140,502 A | 8/1992 | Kudoh et al. |
| 5,522,851 A | 6/1996 | Fayram |

(Continued)

FOREIGN PATENT DOCUMENTS

| | | |
|---|---|---|
| JP | 6053091 A | 2/1994 |
| JP | 2000-036439 A | 2/2000 |

(Continued)

OTHER PUBLICATIONS

International Search Report for International Application No. PCT/US2014/051581, Dec. 9, 2014.

*Primary Examiner* — Nguyen T Ha
(74) *Attorney, Agent, or Firm* — Monahan & Company, LLC; Timothy J. Monahan

(57) ABSTRACT

An electrolytic capacitor capable of operating at 75 g or greater is provided having a case with a base and a lid, with a wound capacitor element positioned on its side, lengthwise along the bottom of the base and with the underside of the lid pressed against the length of the capacitor element, to frictionally engage the capacitor element. The case is provided with inwardly projecting surfaces, including a bulkhead at one end of the capacitor element and ridges on the lid, which function as barriers to restrict movement of the capacitor element within the case. A compartment is created at one end of the case, to allow space for terminals, which are embedded in a non-conductive support matrix.

30 Claims, 5 Drawing Sheets

(56) References Cited

U.S. PATENT DOCUMENTS

| | | |
|---|---|---|
| 5,798,906 A | 8/1998 | Ando et al. |
| 6,042,624 A | 3/2000 | Breyen et al. |
| 6,094,335 A | 7/2000 | Early |
| 6,117,195 A * | 9/2000 | Honegger ............... 29/623.2 |
| 6,118,646 A | 9/2000 | Yang et al. |
| 6,219,224 B1 * | 4/2001 | Honda ..................... 361/537 |
| 6,307,734 B1 | 10/2001 | Bruvelaitis et al. |
| 6,313,978 B1 | 11/2001 | Stockman et al. |
| 6,334,879 B1 * | 1/2002 | Muffoletto et al. ......... 29/25.03 |
| 6,442,014 B1 | 8/2002 | Lin |
| 6,613,474 B2 | 9/2003 | Frustaci et al. |
| 6,881,516 B2 | 4/2005 | Aamodt et al. |
| 6,885,887 B2 | 4/2005 | O'Phelan et al. |
| 6,898,066 B1 | 5/2005 | Lin |
| 6,952,339 B1 * | 10/2005 | Knowles ................... 361/528 |
| 7,206,186 B1 | 4/2007 | Knight et al. |
| 7,274,551 B1 | 9/2007 | Parler, Jr. et al. |
| 7,375,949 B2 | 5/2008 | Barr et al. |
| 7,481,849 B2 | 1/2009 | Lehtonen et al. |
| 7,570,479 B2 | 8/2009 | Lin |
| 8,098,479 B1 | 1/2012 | Parler, Jr. et al. |
| 8,451,586 B2 * | 5/2013 | Priban ..................... 361/508 |
| 8,976,508 B2 * | 3/2015 | Tamachi et al. ............. 361/502 |
| 2010/0188800 A1 | 7/2010 | Ashizaki et al. |
| 2010/0195271 A1 | 8/2010 | Abe et al. |
| 2011/0228446 A1 | 9/2011 | Stockman |
| 2012/0106030 A1 | 5/2012 | Millman et al. |
| 2012/0154984 A1 | 6/2012 | Ashino et al. |

FOREIGN PATENT DOCUMENTS

| | | |
|---|---|---|
| JP | 2003-309047 A | 10/2003 |
| JP | 2009-194310 A | 8/2009 |
| WO | 99/51301 | 10/1999 |

* cited by examiner

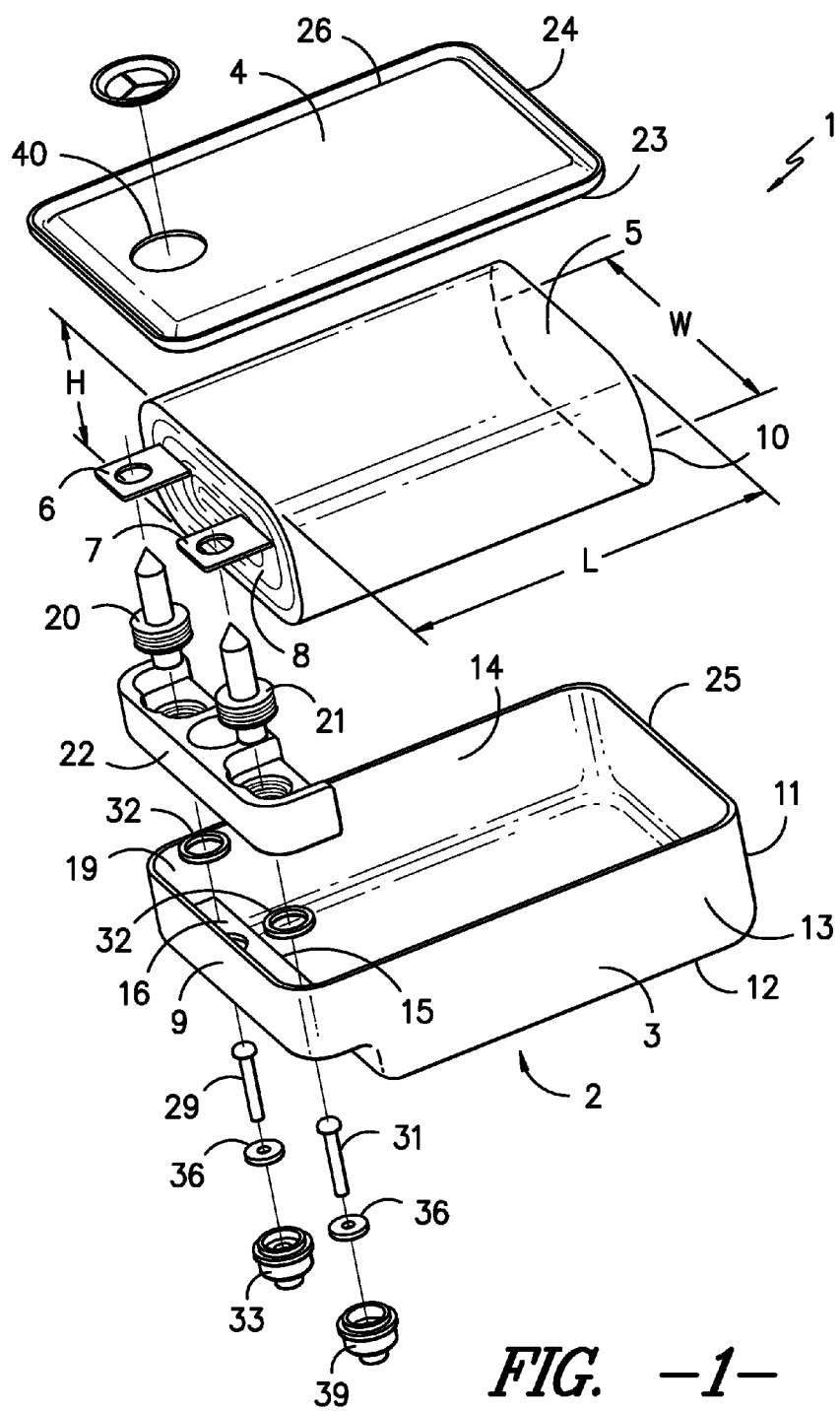
FIG. -1-

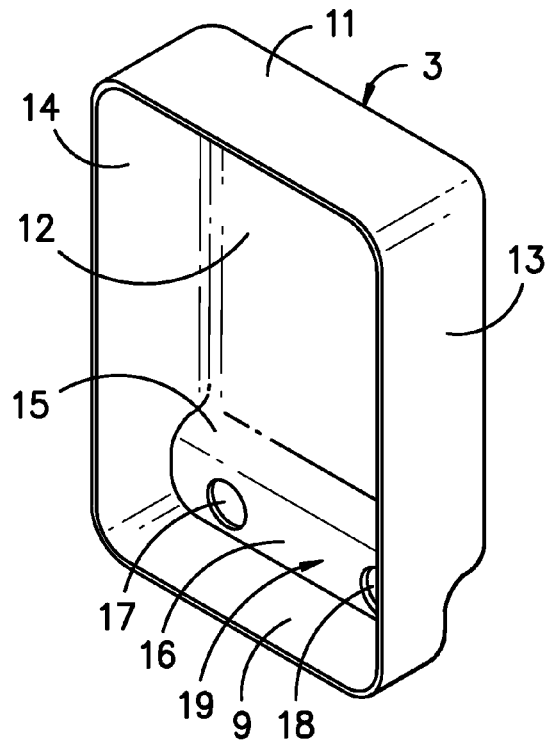
FIG. -2-
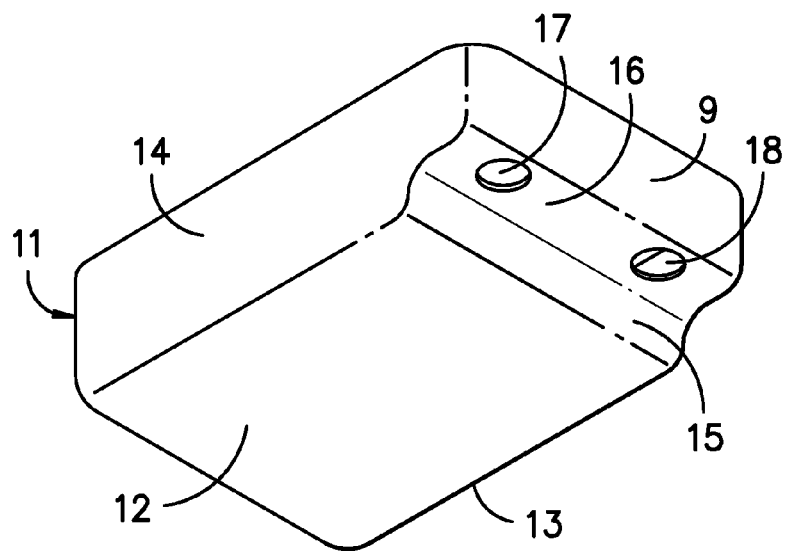
FIG. -3-

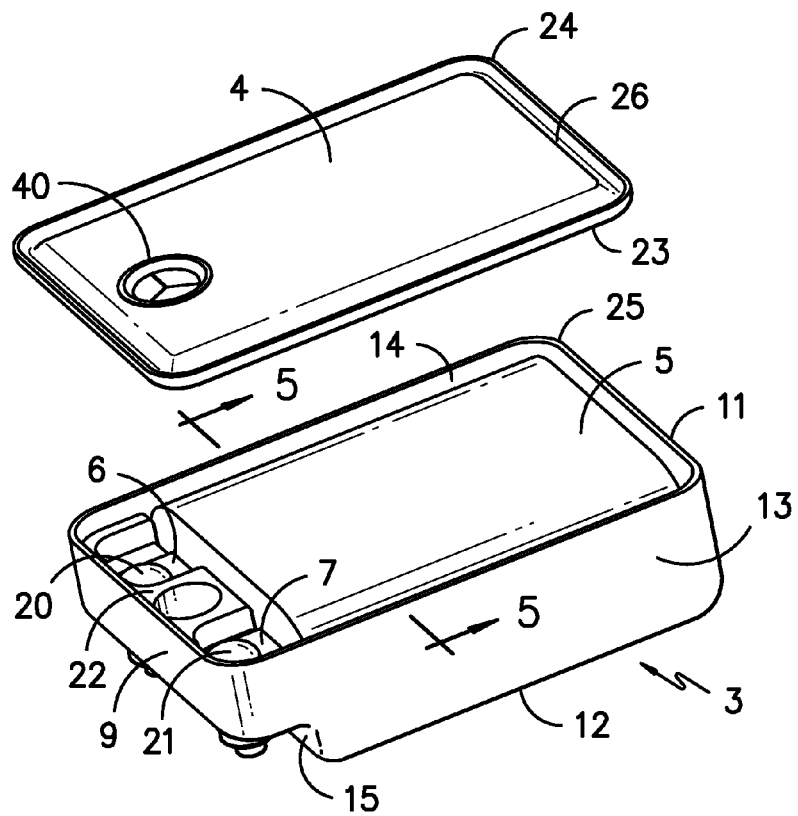
FIG. -4-
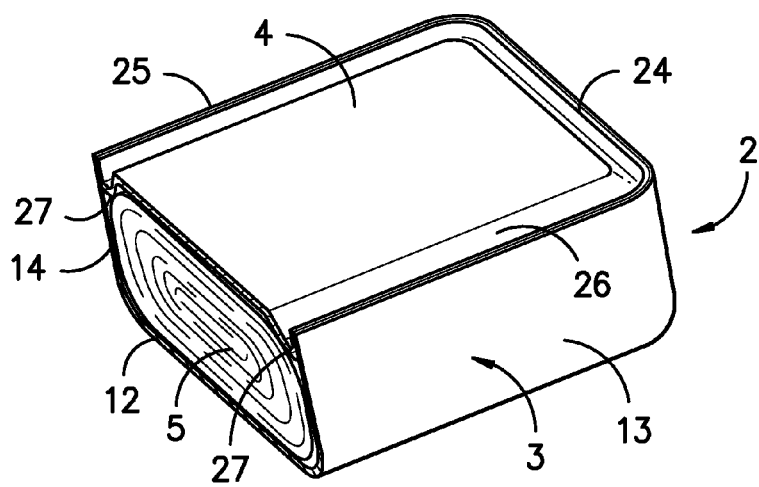
FIG. -5-

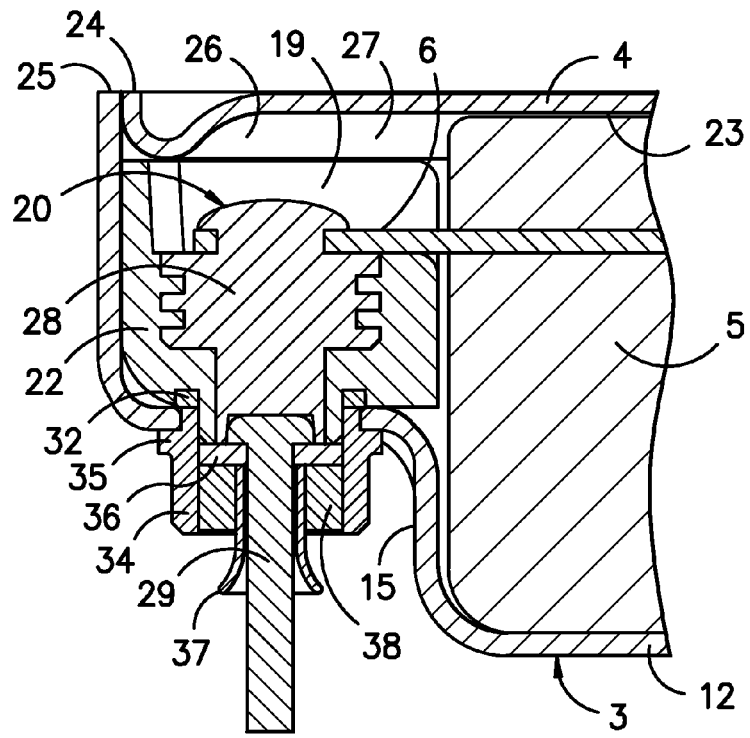
FIG. -6-
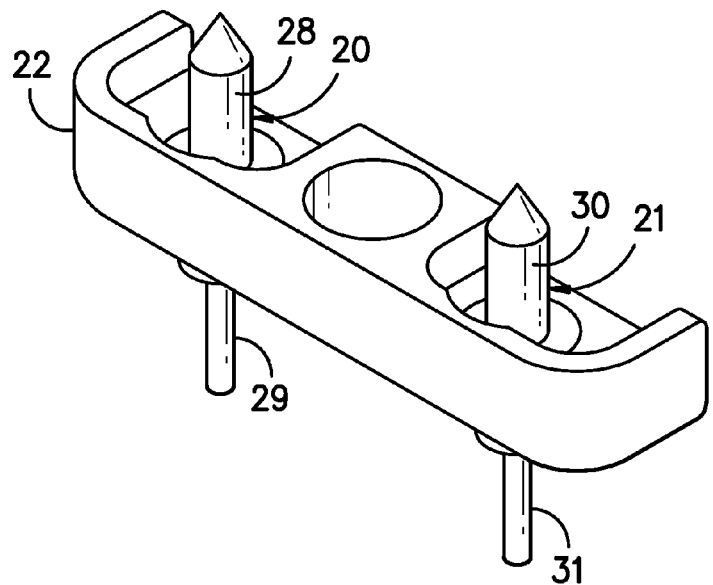
FIG. -7-

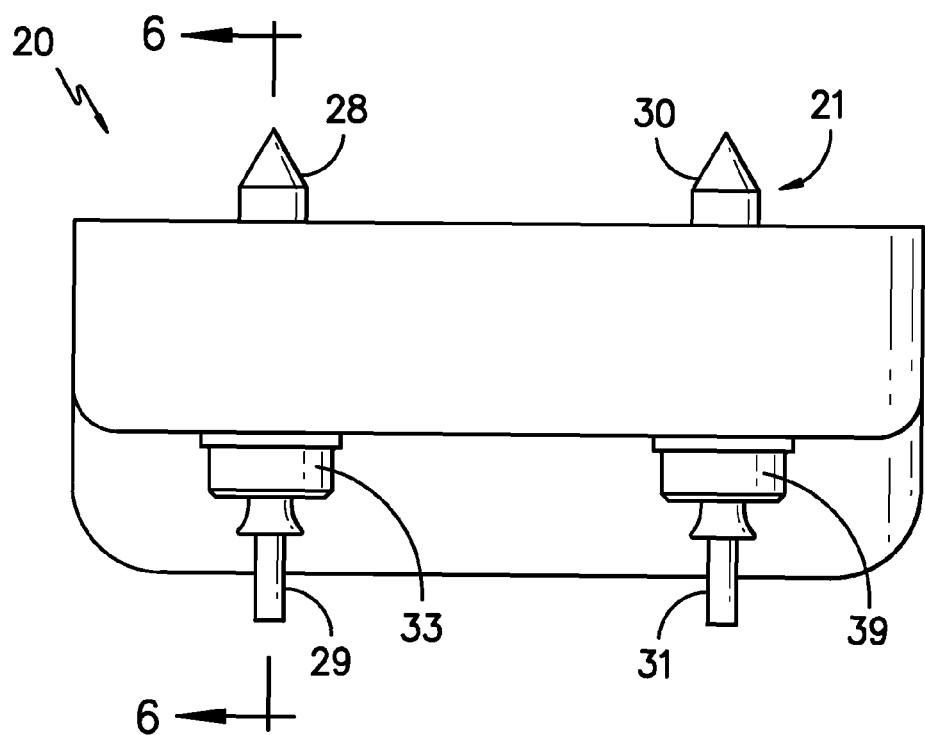
FIG. -8-

CAPACITOR FOR HIGH G-FORCE APPLICATIONS

The present invention is directed to a capacitor capable of withstanding relatively high g-forces, without failure. The invention is particularly useful for electrolytic capacitors having a wound capacitor element.

BACKGROUND OF THE INVENTION

Wound capacitors, such as aluminum electrolytic capacitors, are often used in environments where they are subject to relatively high vibration, impact and centrifugal force. For example, capacitors are commonly incorporated into deep well drilling equipment and the electrical circuitry of aircraft and spacecraft. Typical wound capacitors are rated to withstand g-forces of up to 25 g. Subjecting the capacitor to higher g-forces may result in failure of the capacitor.

Rubin—U.S. Pat. No. 4,584,630 discloses a mounting spacer for an electrolytic capacitor. The mounting spacer is a flexible plastic sheet, which when folded and inserted inside the tubular casing provides alignment and support for the capacitor section.

Hutchins et al.—U.S. Pat. No. 4,987,519 disclose an aluminum electrolytic capacitor having a fluoro-plastic member at each end of the capacitor element. An inwardly directed annular bead deforms the case and engages the fluoroplastic member to create a seal.

Bruvelaitis et al.—U.S. Pat. No. 6,307,734 disclose an electrolytic capacitor having a silicone potting compound surrounding the capacitor within the canister (case). Indentation 108 in canister 102 compresses the silicone compound against the capacitor element to maintain the capacitor element firmly in place.

Ashino et al.—US Patent Application No. 2012/0154984 disclose an electrolytic capacitor with a tape material wound around the outside of the capacitor element. The metal case is crimped inward to engage the tape material, thereby fixing the capacitor element in place relative to the case.

Despite the various prior art attempts to align, support and stabilize a wound capacitor element in a case, there remains a long felt need for a capacitor capable of functioning in high g-force applications.

SUMMARY OF THE INVENTION

The present invention is directed to an electrolytic capacitor able to withstand relatively high g-force without failure. In particular, the capacitors of the present invention are able to withstand 35 g or more, preferably 50 g or more, most preferably 75 g or more, according to MIL-STD-202G, Method 204, Test Condition H—High Frequency Vibration Testing, without failure.

The capacitor has a wound capacitor element, having an anode, a cathode and a dielectric layer. The element has a first end and a second end opposite the first end, with the first and second ends spaced apart lengthwise. First and second tabs extend from the capacitor element and are electrically connected to the anode and cathode, respectively. The wound capacitor may be provided with an oval, flattened or elliptical shape, for example, it may have an aspect ratio of width to height of from 1.5:1 to 7:1, more particularly from 1.5:1 to 4:1. The capacitor element can be characterized by an axis, extending between the first end and the second end, centered at the core of the capacitor element.

The case for the capacitor element has a base and lid, overlaying the base. The base has a bottom, two side walls, on opposite sides of the base, a back wall and a front wall, opposite the back wall. The capacitor element is positioned in the base component of the case, aligned lengthwise, with a first end of the capacitor element facing the front wall and the second end of the capacitor element facing the back wall. A compartment is created in the case between the first end of the capacitor element and the front wall of the base, which allows room for placement of a pair of terminals for connecting the first and second tabs from the capacitor element to circuitry outside of the case.

The lid of the case has a rim along the top edge, corresponding in size to the base. The lid overlays the interior of the base, and the underside of the lid is pressed into contact with the side of the capacitor element, that is, along the length of the element. In one embodiment of the invention, the lid is pressed against the capacitor element with a pressure of 50 lbs./in$^2$ or greater, or even 75 lbs./in$^2$ or greater, before the lid is attached, for example, by welding.

The lid of the case may be provided with at least one, preferably two inward projections, such as ridges, that engage the outer surface of the capacitor element and act as barriers to movement of the capacitor element relative to the case. The projections may be aligned parallel to the axis of the capacitor element and positioned one on either side of the axis. In one example, the lid may be provided with an outer edge that is "recurved", that is, the lid is curved downward to create inward projections and to form a concave area that is in contact with the capacitor element, and then the rim curves upward, so that the rim is facing away from the bottom of the base. In one embodiment of the invention, the rim of the lid is sized to slide within the inside perimeter of the base. When the lid is fitted into place, the rim of the lid may be approximately flush with the top edge of the base.

When the lid is attached to the base, the capacitor element is sandwiched between the underside of the lid and the bottom of the base with sufficient pressure to frictionally engage the capacitor element, thereby creating strong resistance to the movement of the capacitor element relative to the case, especially in the lengthwise direction.

The movement of the capacitor element relative to the case may be restricted by designing the interior of the case to substantially conform to the capacitor element, when the capacitor is assembled. For example, the interior of the base and the underside of the lid may have curved edges so that at least 80% of the surface area of the sides of the capacitor element (i.e. excluding the first and second ends) or even at least 90% of the surface area of the sides of the capacitor element is in contact with the case. By way of further example, the interior of the base between the first side wall and the bottom and between the second side wall and the bottom may be provided with a radius of 0.125 inches or greater, through an angle of 75° or greater per junction of side wall and bottom.

In one embodiment of the invention, the base is provided with a bulkhead, positioned between the back wall and the front wall of the base. The capacitor element is positioned in the base with the first end of the capacitor element adjacent the bulkhead and the second end of the capacitor element adjacent the back wall of the base. The bulkhead may have a surface aligned substantially parallel to the back wall of the base, and extending between the side walls of the base. In one embodiment of the invention, the bulkhead is a wall extending parallel to the back wall of the base, from one side wall of the base to the other side wall.

The bulkhead functions as a barrier to movement of the capacitor element within the case, in particular, as a barrier to lengthwise movement of the capacitor element toward the front wall of the base. The height of the bulkhead may extend from the bottom of the base to a height of 20% or more of the height of the capacitor element. In one example, the bulkhead extends from the bottom of the base to a height of from 25% to 75% of the height of the capacitor element.

The bulkhead may be an integral part of the base and can be characterized as inward projection of the base that engages the capacitor element and restricts movement of the capacitor element relative to the case. The term "integral part" means that the structure of the bulkhead and the rest of the parts of the base, e.g. bottom, sides, front and back wall, are formed from a continuous sheet of material. In one example, the base is formed by stamping a metal sheet.

In the embodiments of the invention having a bulkhead, a shelf may be created in the base between the top edge of the bulkhead and the front wall of the base. The shelf may be aligned approximately parallel to the bottom of the base at a height above the bottom, to create a recess in the base of the case. It is possible to position the terminals in holes formed in the shelf (used to connect the tabs extending from the capacitor element to electrical circuitry outside of the case), whereby the terminals are raised above the bottom of the base and wherein the exterior of the front wall of the base does not have any leads or other electrical connections extending therefrom. The leads extending from the shelf formed in the base may be connected to a circuit board or other electrical circuit directly below and within the perimeter of the case.

The bulkhead may consist of or include a planar wall aligned parallel to the back wall of the base, with struts or other structural support extending from the bulkhead to the front wall of the base, for maintaining alignment of the bulkhead and preventing the capacitor element from sliding towards the front wall. Openings may be provided in the bulkhead for the first and second tabs of the capacitor element to be connected to the terminals in the compartment formed between the first end of the element and the front wall of the base.

In one embodiment of the invention, the base is provided with at least one inward projection or the lid is provided with at least one inward projection, or both the base and the lid may be provided with inward projections capable of engaging the capacitor element and restricting its movement relative the case. By way of example, both the base and the lid may be provided with inward projections that are perpendicular to each other to restrict movement of the capacitor element relative to the base in both the width and length direction of the capacitor element. Each of the base and lid may be formed from a unitary piece of metal, for example by stamping. An advantage of the present invention is that the inward projections may be formed in the base and/or lid, prior to inserting the capacitor element within the case. Thus, one avoids having to crimp the case, after the capacitor is assembled, which could otherwise damage the capacitor element.

The tabs from the anode and cathode are each electrically connected to a terminal. Each of the terminals extend from inside the case, where they are connected to one of the tabs from the capacitor element, though a hole in the case, and outside of the case. A seal is provided around each portion of the terminal extending outside of the case. The seal may be a hermetic seal.

In one example, the point of connection between the respective tabs and terminal are at approximately the same height, thereby facilitating making the connection and avoiding long tabs and slack, which may lessen the ability of the capacitor to withstand high g-forces. Accordingly, it is desirable that the tabs are bent less than 90°, preferably less than 60°.

The terminals may be embedded in a non-conductive matrix material, which insulates the terminals from the case and stabilizes the terminals from movement relative to the case. The non-conductive matrix material may form a continuous layer on a portion of the interior of the base and conform thereto. For example, the matrix material may overlay the shelf formed between the front wall and the bulkhead. In one embodiment of the invention, both terminals are supported in a matrix material, with the matrix material having been formed into a unitary part.

The terminals in electrolytic capacitors may be crafted from two different metal compositions. For example, aluminum or other valve metal may comprise a first component of the terminal or rivet, positioned in the interior of the case and connected to a tab extending from the capacitor element. The component of the terminal that extends through the seal and exterior to the case may be a metal rod that can be soldered to the tube component of a glass hermetic seal, such as tin plated copper. The portion of the rod from the point at which it is bonded to the rivet to the point at which it enters the seal may be protected from the electrolyte in the case by encapsulating the rod in the non-conductive matrix material, or by the introduction of suitable seals and gaskets, as is hereinafter detailed.

Additional stability of the capacitor element within the case may be achieved by providing a capacitor element with the cathode extending 0.080 inches or more beyond the anode, at one or both of the ends of the capacitor element. The cathode is able to absorb greater shock than the anode, without a deterioration in performance.

For high g-force applications, it is desirable to minimize movement of the capacitor element within the case. Accordingly, the invention incorporates one or more of the following features, and combinations thereof. The inside of the case may frictionally engage the outside of the capacitor element, for example by assembling the capacitor with pressure exerted against the capacitor element by the lid and bottom of the base. The base and/or lid of the case may be provided with inward projections, to restrict movement of the capacitor element within the case. The case may be designed to follow the contours of a capacitor element having an oval or elliptical cross-section, when the capacitor is assembled. The terminals that connect the tabs of the capacitor element to electrical circuitry may be embedded in a matrix conforming to the interior of the case, to prevent movement of the terminals relative to the case.

BRIEF DESCRIPTION OF THE DRAWINGS

FIG. 1 is an exploded, perspective view of the capacitor.

FIG. 2 is a perspective view of the interior of the base component of the case.

FIG. 3 is a perspective view of the exterior of the base component of the case.

FIG. 4 is a perspective view of the capacitor with the lid removed.

FIG. 5 is a cross-sectional view of the capacitor.

FIG. 6 is a cross-sectional view of the terminal within the capacitor case.

FIG. 7 is a perspective view of the terminals embedded in a support matrix.

FIG. 8 is a front view of the partially assembled capacitor with the terminals and hermetic seals installed in the base section of the case.

DETAILED DESCRIPTION OF THE INVENTION

Without limiting the scope of the invention, the preferred embodiments and features are hereinafter set forth. Any United States patents and published patent applications cited in the specification are hereby incorporated by reference. Unless otherwise indicated, conditions are 25° C., 1 atmosphere of pressure, 50% relative humidity, and the percentage of materials in compositions are by weight.

The capacitor of the present invention may be an electrolytic capacitor. The electrolytic capacitor has a capacitor element positioned in a case. The capacitor element is made up of an anode, a cathode, a dielectric and an electrolyte solution, forming a capacitor capable of supporting a direct current potential, and thereby storing an electrical charge and energy. The anode is a valve metal upon which resides a dielectric, which is generally grown from the base metal in an anodizing electrochemical bath. A "valve metal" is defined as a metal which grows an electrically insulating oxide in the presence of an electrolyte when a positive potential is applied to the metal with respect to the electrolyte. Examples of such metals are aluminum, tantalum, niobium, tungsten, titanium and zirconium. The anode metal contacts the dielectric on its positively charged side, and the electrolyte contacts the dielectric on its negatively-charged side and conveys the charge to the cathode.

The potentials of the anode and cathode may be conducted to positive and negative terminals, respectively, by means of a tab, wire or other metallic conductor. With respect to the cathode, the capacitor case may be used for the negative terminal.

The anode may be in the form of foil, which may be treated to enhance its performance, as is known in the art, for example, the foil may be etched to increase its surface area. The cathode may be the same or a different metal than the anode or the cathode may be a non-metal, and it is not required that the cathode be capable of forming an oxide. The form of the cathode is selected to be compatible with the anode, to meet the objective of creating a capacitor. The cathode may be a foil. This invention can be employed with both polarized and non-polarized wet electrolytic capacitors.

The anode and cathode are sheets that are wound together with a paper separator, to create an oval, flattened or elliptical cross-section. By way of example, the capacitor element may have an aspect ratio of width to height of from 1.5:1 to 7:1, more particularly from 1.5:1 to 4:1.

An electrolyte solution is provided in the case, in sufficient quantity to immerse the capacitor element. Generally, the electrolyte solution may be formed of solutes that ionize upon dissolution in a suitable solvent to create an electrically conductive medium. A liquid, electrolyte solution may be added to the capacitor, or the solute and solvent may be added separately to the capacitor, with dissolution occurring in situ. Examples of suitable solutes include organic acids and bases, and inorganic acids and bases. Examples of suitable solvents include water, ethylene glycol, dimethylformamide (DMF), N-methylformamide (NMF), and gamma-butyrolactone (GBL). Particularly useful electrolyte solutions include solutions of sulfuric acid, boric acid and ammonium adipate.

Examples of suitable capacitor elements for use in electrolytic capacitors of the present invention may be found in U.S. Pat. Nos. 7,206,186 B1 and 7,274,551 B1.

Referring to FIG. 1, the capacitor of the subject invention is shown in an exploded view. Capacitor 1 has a case 2 made up of base 3 and lid 4. Capacitor element 5 is characterized by a length "L," width "W" and height "H." Capacitor element has tabs 6 and 7 electrically connected to the anode and cathode of capacitor element 5. Capacitor element 5 is positioned lengthwise in base 3 of case 2, with a first end 8 facing front wall 9 of base 3 and a second end 10 facing back wall 11 of base 3. The axis of the capacitor element is parallel to the bottom of the base and the lid.

The tabs from the capacitor element may be conveniently positioned approximately midway along each of the sheets forming the anode and the cathode of the capacitor element. In various embodiment of the invention, a tab is positioned midway along the length of the sheet (with the length based on the linear extent of the unwound sheet) plus or minus 15% of the length, or in particular plus or minus 10% of the length. The tabs may be positioned to extend from the first end of the capacitor element at a height of ½ or greater of the height of the capacitor element, as measured from the bottom of the base.

The case is made from a material that is substantially impermeable to gases. By way of example, the case may be made out of metal, in particular, steels (stainless or other alloys), copper, tantalum, aluminum, titanium, niobium, nickel, iron, and zinc. Preferably, the case is made out of steel or steel alloys, including cold-rolled steel, mild steel and stainless steel, tantalum, titanium and niobium. If the case material is susceptible to corrosion, either internally or externally, the material may be coated, plated or provided with other protective treatment, as is known to those skilled in the art.

FIGS. 2 and 3 show the interior and exterior view of base 3, respectively. Base 3 has front wall 9, back wall 11, bottom 12, and side walls 13 and 14. Bulkhead 15 is aligned substantially parallel to back wall 11 and extends laterally between side walls 13 and 14, perpendicular to the axis of capacitor element 5. Bulkhead 15 extends upward from bottom 12 of base 3 and provides an inward projection that is a barrier to the movement of capacitor element 5 towards front wall 9. A shelf 16 connects bulkhead 15 to front wall 9. Shelf 16 has holes 17 and 18 for connecting the capacitor element to electrical components located exterior to case 2. It can be understood that holes 17 and 18 may be located in front wall 9 of base 3. Nevertheless, the position of the holes through shelf 16 is believed to provide certain advantages, namely that a recess is created underneath the shelf and electrical connections can be made within the outer perimeter of the case.

Referring to FIG. 4, a partially assembled capacitor is shown, prior to lid 4 being attached. The first end 8 of capacitor element 5 is adjacent bulkhead 15 and the second end 10 of capacitor element 5 is adjacent back wall 11. A compartment 19 is created between the front end 8 of capacitor element 5 and front wall 9 of base 3. Terminals 20 and 21 are positioned in compartment 19 and at least partially embedded in non-conductive matrix 22, which conforms the interior of base 3 and is supported on shelf 16. Tabs 6 and 7 of capacitor element 5 are electrically connected to terminals 20 and 21, respectively.

Referring to FIG. 5, a cross-sectional view of the assembled capacitor is shown. Capacitor element 5 is sandwiched between bottom 12 of base 3 and the underside 23 of lid 4. Lid 4 has rim 24 along its peripheral edge, where lid 4 is attached to the upper perimeter 25 of base 3. In the embodiment shown in FIG. 5, lid 4 has a recurved lip 26, extending downward from the underside 23 of lid 4, with rim 24 facing upward, away from bottom 12 of base 3. Recurved lip 26 creates two inward projections or ridges 27 and a concave area in the portion of underside 23 of lid 4 in contact along the length of capacitor element 5. Ridges 27 of recurved lip 26 extend into the interior of case 2 and engages capacitor element 5 along both sides of its length to create a barrier to sideways movement of capacitor element 5 within case 2, in particular, movement of capacitor element 5 towards either of side walls 13 and 14.

Before lid 4 is attached to base 3, downward pressure is applied to lid 4 to compress capacitor element 5, urging capacitor element 5 against the interior of base 3, in particular, against side walls 13 and 14. By way of example, downward pressure of 50 lbs./in$^2$ or greater, or even 75 lbs./in$^2$ or greater is applied to the lid when the capacitor is assembled, thereby compressing the capacitor element between the lid and the bottom of the base. In the embodiment shown in FIGS. 1, 4 and 5, lid 4 fits inside upper perimeter 25 of base 3 and may slide against the interior of base 3, as pressure is applied to lid 4. Base 3 and lid 4 can be attached together to create a hermetic seal using a suitable technique, including by soldering, welding, such as a tungsten inert gas weld (TIG), plasma weld, or laser weld, or other means to create a metallurgical bond. For example, rim 24 of lid 4 may be positioned flush with upper perimeter 25 of base 3 and welded thereto. Galvanic corrosion may be minimized by employing the same metal for the base and the lid.

When the capacitor is assembled, capacitor element 5 frictionally engages the interior of case 2. In one embodiment of the invention, 80% or greater, or even 90% or greater of the exterior of capacitor element 5, not including first end 8 and second end 10, is in contact with the inside of case 2. It can be understood that the coefficient of friction between capacitor element 5 and the interior of case 2 can be increased by treating the interior surface of case 2 with a suitable coating or abrading or roughing the surface, and/or treating the exterior of capacitor element 5 with a suitable coating or wrapping the exterior with a suitable film or sheet.

In one embodiment of the invention, the radius between the bottom 12 of base 3 and side walls 13 and 14 is selected to conform to the dimensions of capacitor element 5 when case 2 is assembled with pressure against capacitor element 5. Referring to FIG. 5, the radius between bottom 12 and side walls 13 and 14 is at least 0.125 inches through an angle of at least 75°.

FIGS. 6 and 7 show details of terminals 20 and 21, non-conductive matrix 22 and the hermetic seals associated with the terminals. Terminal 20 has rivet 28, which is attached to lead 29, for example, by welding the two materials together. Rivet 28 is electrically connected to tab 6, and fixed in place by deforming (bucking) the rivet. Rivet 28 and lead 29 are made of dissimilar metals. Rivet 28 may be aluminum or other valve metal resistant to the electrolyte in the capacitor. Lead 29 may be a metal that can be welded to rivet 28 and can be soldered to the hermetic seal, such as a tin plated copper lead. While the details of construction are illustrated with regard to terminal 20, it can be understood that terminal 21 may be constructed the same or similar to terminal 20. Referring to FIG. 7, terminal 21 has rivet 30 and lead 31, extending therefrom.

In one embodiment of the invention, terminals 20 and 21 are embedded in the non-conductive matrix 22 prior to final assembly. For example, non-conductive matrix 22 may be cast, molded, sprayed or otherwise formed around terminal 20 and terminal 21. Matrix 22 is designed to conform to the internal shape of base 3, in particular, to rest on shelf 16 in compartment 19, and to span and abut side walls 13 and 14. In one embodiment of the invention, matrix 22 is a unitary part. It can be understood that matrix 22 supports the terminals, thereby minimizing movement or vibration of the terminals relative to the case, which may otherwise cause the capacitor to fail under high g-forces.

It is desirable that lead 29 not be in contact with the electrolyte. Accordingly, O-ring 32 is provided at the interface between non-conductive matrix 22 and base 3 and/or the hermetic seal. Hermetic seal 33 is attached to base 3, for example, by welding, outer sleeve 34 to base 3. In the embodiment shown, outer sleeve 34 is partially inserted into hole 17 until shoulder 35 abuts the exterior of base 3. Washer 36 and tube 37 are positioned around lead 29. Glass seal 38 is created by pouring molten glass into the space between outer sleeve 34 and tube 37. To complete the assembly of the hermetic seal, lead 29 is pulled downward, i.e. away from base 3, to compress O-ring 32, and lead 29 is soldered to tube 37.

The configuration and operation of the terminal and the hermetic seal have been described with regard to terminal 20. Referring to FIG. 8, it can be understood that terminal 21 can be provided with hermetic seal 39 and that such components may be assembled and provided with an O-ring and washer, as is terminal 20, to provide the same structure and corresponding functionality.

Once capacitor element 5 is inserted into base 3, tabs 6 and 7 have been electrically connected to terminals 20 and 21, respectively, and lid 4 attached to base 3, the capacitor can be filled with the electrolyte. Referring to FIG. 1, lid 4 is provided with fill-hole 40. After the capacitor is filled with electrolyte, fill-hole 40 is sealed, for example, by welding.

While the use of the present invention in combination with electrolytic capacitor is believed to confer the greatest benefits, in one alternative embodiment of the invention, the capacitor is a film capacitor. Examples of suitable capacitor elements for use in film capacitors of the present invention may be found in U.S. Pat. No. 8,098,479 B2.

Testing

Capacitors of the present invention were constructed and tested for use in high g-force applications according to the military standards in effect on Jan. 1, 2013, namely MIL-STD-202G, Method 204, Test Condition H, Vibration—High Frequency, referred to herein as "MIL-STD-202G, Method 204." The high frequency vibration test is performed for the purpose of determining the effect on component parts of vibration in the frequency ranges of 10 to 500 hertz (Hz), 10 to 2,000 Hz or 10 to 3,000 Hz, as may be encountered in aircraft, missiles, and tanks. The test was conducted 12 times in each perpendicular direction (x-y-z), for 20 minutes each time, for a total of 12 hours of testing for each capacitor.

Electrolytic capacitors of the design shown in FIGS. 1-8 and described herein were tested according to MIL-STD-202/Method 204. The capacitors were tested at 80 g, without failure.

There are, of course, many alternative embodiments and modifications of the invention, which are intended to be included in the following claims.

What we claim is:

1. An electrolytic capacitor, comprising:
   (a) a case comprising (i) a base having an interior and an exterior, a bottom, a first side wall and a second side wall opposite the first side wall, a back wall and a front wall opposite the back wall, and (ii) a lid having a rim and an underside, wherein the lid overlays the interior of the base and is parallel to the bottom of the base, and wherein the rim of the lid is attached to the base to create a seal therewith;
   (b) a wound capacitor element, having an anode, a cathode and a dielectric layer, wherein the capacitor element is characterized by a width, a height, and a length, the capacitor element further having a first end and a second end opposite the first end, and a first tab and a second tab connected to the anode and cathode, respectively, whereby the capacitor element is positioned inside the case with the first end of the capacitor element facing the front wall of the base and the second end of the capacitor element facing the back wall of the base, and the underside of the lid and the bottom of the base are in contact with the capacitor element along its length with sufficient pressure to frictionally engage the capacitor element and resist the capacitor elements lengthwise movement relative to the case, and whereby a compartment is created within the case between the first end of the capacitor element and the front wall of the base, and the first and second tabs extend into the compartment;

(c) a first terminal having a first end positioned in the compartment and connected to the first tab of the capacitor element and a second end extending through a first hole in the case;

(d) a first hermetic seal attached to the exterior of the case and surrounding the first hole in the case, wherein the second end of the first terminal extends through the first hermetic seal and is electrically insulated from the case;

(e) a second terminal having a first end positioned in the compartment and connected to the second tab of the capacitor element and a second end extending through a second hole in the case;

(f) a second hermetic seal attached to the exterior of the case and surrounding the second hole in the case, wherein the second end of the second terminal extends through the second hermetic seal and is electrically insulated from the case; and (g) an electrolyte solution contained in the case and in contact with the capacitor element.

2. The capacitor of claim 1, wherein the capacitor can withstand 50 g, according to MIL-STD-202/Method 204, without failure.

3. The capacitor of claim 1, further comprising a bulkhead aligned parallel to the back wall and positioned between the back wall and the front wall, wherein the first end of the capacitor element is adjacent the bulkhead and the second end of the capacitor element is adjacent the back wall of the base, and wherein the bulkhead is a barrier to movement of the capacitor element towards the front wall of the base.

4. The capacitor of claim 3, wherein the bulkhead is integrally formed with the base, and the base further comprises a shelf extending between the bulkhead and the front wall of the base, and the first and second holes in the case are positioned in the shelf.

5. The capacitor of claim 3, wherein the bulkhead is integrally formed with the base, and wherein the base is formed by the process of stamping.

6. The capacitor of claim 1, wherein the capacitor element has an aspect ratio of width to height of from 1.5:1 to 7:1.

7. The capacitor of claim 6, wherein the interior of the base between the first side wall and the bottom and between the second side wall and the bottom has a radius of 0.125 inches or greater, through an angle of 75° or greater.

8. The capacitor of claim 1, wherein a pressure of 50 lbs./in$^2$ or greater is applied to the lid when the capacitor is assembled, thereby compressing the capacitor element between the lid and the bottom of the base.

9. The capacitor of claim 8, wherein the interior of the base between the first side wall and the bottom and between the second side wall and the bottom conforms to the capacitor element.

10. The capacitor of claim 1, wherein the lid has an outer edge and the outer edge is recurved, to create at least two inward projections, such that the rim of the lid is facing away from the bottom of the base, and a portion of the underside of the lid in contact with the capacitor element is concave.

11. The capacitor of claim 1, wherein the anode and the cathode of the capacitor element comprise first and second wound foils, and the first and second tabs of the capacitor element are positioned + or −15% of the length of the foil from the midpoint of the respective first and second foils.

12. The capacitor of claim 1, wherein the first and second tabs are connected to the first and second terminals, respectively, and the tabs are bent less than 90°.

13. The capacitor of claim 1, further comprising a nonconductive matrix material positioned in the interior of the case and wherein the first and second terminals are embedded in the matrix material.

14. The capacitor of claim 13, wherein the rivets of the first and second terminal are aluminum, and the leads of the first and second terminals are tin plated copper.

15. An electrolytic capacitor, comprising:

(a) a wound capacitor element, having an anode, a cathode and a dielectric layer, wherein the capacitor element is characterized by a width, a height, and a length, the capacitor element further having a first end and a second end opposite the first end, and a first tab and a second tab connected to the anode and cathode, respectively;

(b) a case comprising (i) a base having an interior and an exterior, a bottom, a first side wall and a second side wall opposite the first side wall, a back wall and a front wall opposite the back wall, and a bulkhead aligned parallel to the back wall at a distance from the back wall approximately the length of the capacitor element, wherein the capacitor element is positioned in the base with the first end of the capacitor element adjacent the bulkhead and the second end of the capacitor element adjacent the back wall, wherein the bulkhead is a barrier to movement of the capacitor element towards the front wall of the base, and wherein the first and second tabs extend into a compartment formed between the front wall of the base and first end of the capacitor element; and (ii) a lid having a rim and an underside, wherein the lid overlays the interior of the base and the capacitor element, and wherein the rim of the lid is attached to the base to create a seal therewith, and wherein the underside of the lid is in contact with the capacitor element along the length of the capacitor element;

(c) an electrolyte solution contained in the case and in contact with the capacitor element;

(d) a first terminal positioned in a first hole in the base of the case, the first terminal having (i) a rivet positioned within the interior of the case and connected to the first tab of the capacitor element, and (ii) a lead extending outside of the case, wherein the rivet and the lead of the first terminal are bonded together [welded] and comprise different metallic compositions;

(e) a first hermetic seal attached to the exterior of the case and surrounding the first hole in the base, wherein the lead of the first terminal extends through the first hermetic seal and is bonded thereto;

(f) a second terminal positioned in a second hole in the base of the case, the second terminal having (i) a rivet positioned within the interior of the case and connected to the first tab of the capacitor element, and (ii) a lead extending outside of the case, wherein the rivet and the lead of the second terminal are bonded together [welded] and comprise different metallic compositions; and (g) a second hermetic seal attached to the exterior of the case and surrounding the second hole in the base, wherein the lead of the second terminal extends through the second hermetic seal and is bonded thereto.

16. The capacitor of claim 15, wherein the capacitor can withstand 75 g, according to MIL-STD-202/Method 204, without failure.

17. The capacitor of claim 16, wherein the bulkhead is integrally formed with the base, and the base further comprises a shelf extending between the bulkhead and the front wall of the base, and the first and second holes in the case are positioned in the shelf.

18. The capacitor of claim 16, wherein the bulkhead is integrally formed with the base, and wherein the base is formed by the process of stamping.

19. The capacitor of claim 15, wherein the capacitor element has an aspect ratio of width to height of from 1.5:1 to 4:1.

20. The capacitor of claim 15, wherein the interior of the base between the first side wall and the bottom and between the second side wall and the bottom has a radius of 0.125 inches or greater, through an angle of 75° or greater.

21. The capacitor of claim 15, wherein a pressure of 75 lbs./in$^2$ or greater is applied to the lid when the capacitor is assembled, thereby compressing the capacitor element between the lid and the bottom of the base.

22. The capacitor of claim 21, wherein the interior of the base between the first side wall and the bottom and between the second side wall and the bottom conforms to the capacitor element.

23. The capacitor of claim 15, wherein the lid has an outer edge and the outer edge is recurved, such that the rim of the lid is facing away from the bottom of the base, and at least two inward projections in the shape of ridges engage the capacitor element.

24. The capacitor of claim 15, wherein the anode and the cathode of the capacitor element comprise first and second wound foils, and the first and second tabs of the capacitor element are positioned + or −10% of the length of the foil from the midpoint of the respective first and second foils.

25. The capacitor of claim 15, wherein the bulkhead extends upward from the bottom of the base to a height of from 1/3 or more of the height of the capacitor element.

26. The capacitor of claim 25, wherein the first and second tabs extend from the first end of the capacitor element at 1/2 the height of the capacitor element or greater, as measured from the bottom of the base.

27. The capacitor of claim 15, wherein the cathode of the capacitor element extends 0.080 inches or greater beyond the anode at the first end and the second end of the capacitor element.

28. The capacitor of claim 15, further comprising a non-conductive matrix material positioned in the interior of the case and wherein the first and second terminals are embedded in the matrix material.

29. The capacitor of claim 28, further comprising a shelf extending between the bulkhead and the front wall of the base, and the first and second holes in the case are positioned in the shelf, and wherein the matrix material is a unitary part and is positioned on the shelf, and the matrix material restricts movement of the first and second terminals relative to the case.

30. The capacitor of claim 15, wherein the base comprises a first inward projection capable of resisting movement of the capacitor element relative to the case and the lid comprises a second inward projection capable of resisting movement of the capacitor element relative to the case, and wherein the first and second inward projections are perpendicular to each other.

\* \* \* \* \*